United States Patent [19]

Lorenzo Barroso

[11] Patent Number: 4,533,164
[45] Date of Patent: Aug. 6, 1985

[54] EQUIPMENT FOR KNOTTING AUTOMATICALLY THE OPENINGS OF FLEXIBLE CONTAINERS

[76] Inventor: Angel Lorenzo Barroso, Arquitecto Cabanes, s.n., Mataro (Barcelona), Spain

[21] Appl. No.: 487,766

[22] Filed: Apr. 22, 1983

[30] Foreign Application Priority Data

Apr. 23, 1982 [ES] Spain ............................ 512.263
Apr. 23, 1982 [ES] Spain ............................ 265.171[U]

[51] Int. Cl.³ .......................................... B65H 69/04
[52] U.S. Cl. ........................................ 289/2; 17/34; 17/44.2; 223/37; 289/18.1
[58] Field of Search ............... 289/2, 17, 18.1; 17/33, 17/34, 35, 44.2; 112/121.19; 29/241, 433; 223/37

[56] References Cited

U.S. PATENT DOCUMENTS

| | | | |
|---|---|---|---|
| 2,070,568 | 2/1937 | Almgren | 29/241 X |
| 2,322,447 | 6/1943 | Hensel | 289/18.1 X |
| 2,616,572 | 11/1952 | McLaughlin | 29/241 X |
| 3,318,623 | 5/1967 | Barroso | 289/18.1 X |
| 3,483,801 | 12/1969 | Kupcikevicius | 17/34 X |
| 3,533,495 | 10/1970 | Wallace | 17/33 X |
| 3,672,001 | 6/1972 | Greider | 17/33 |
| 3,940,169 | 2/1976 | Kock | 289/18.1 |
| 4,313,630 | 2/1982 | Barroso | 289/1.5 |

FOREIGN PATENT DOCUMENTS

| | | | |
|---|---|---|---|
| 2950603 | 6/1981 | Fed. Rep. of Germany | 17/44.2 |
| 295446 | 1/1964 | Spain . | |
| 518606 | 3/1940 | United Kingdom | 289/18.1 |

Primary Examiner—Louis K. Rimrodt
Attorney, Agent, or Firm—Cushman, Darby & Cushman

[57] ABSTRACT

A movable shuttle is provided for hooking the loop of a cord and a pneumatic cylinder is connected to the shuttle mount which reciprocates between limit switches for transporting the hooked loop and the material about which the loop is formed to a transfer station; at the transfer station, a pivoting arm is provided to interact with the shuttle hook to disengage the loop and deposit the loop on a storage arm; a mechanism is also provided for folding a web of material into multiple longitudinal folds progressively by means of forming members disposed along a narrowing transport path for the material to be folded.

8 Claims, 13 Drawing Figures

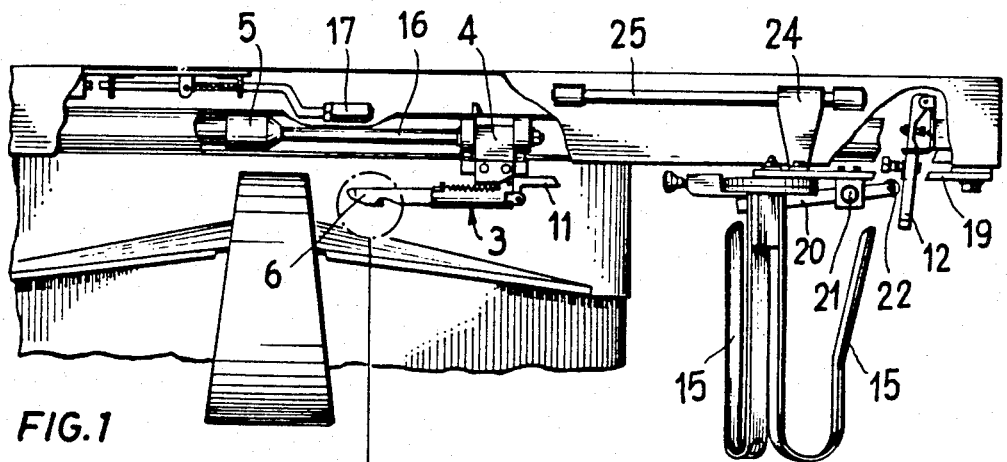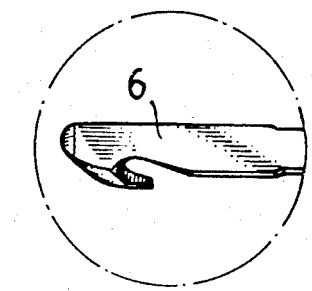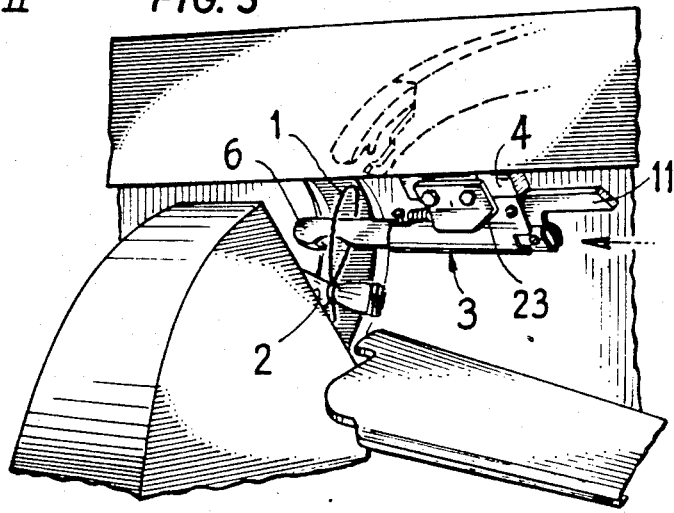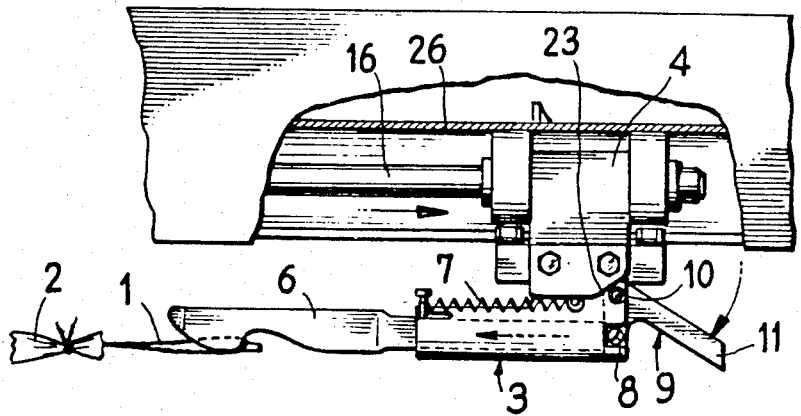

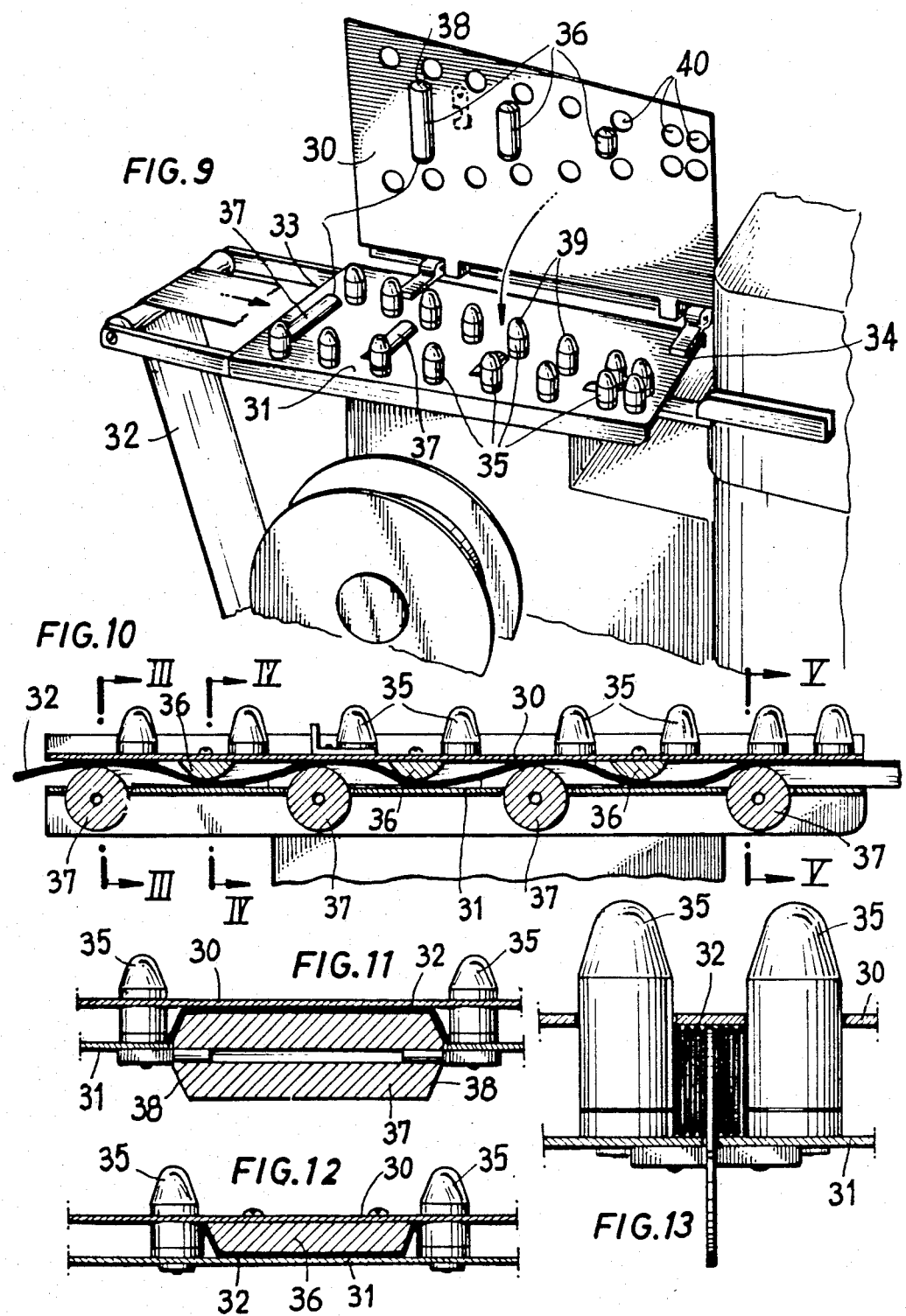

EQUIPMENT FOR KNOTTING AUTOMATICALLY THE OPENINGS OF FLEXIBLE CONTAINERS

The present invention refers to some improvements in equipment for knotting automatically the openings of flexible containers, similar to the equipment which makes a knot by forming an end which is used to hang the flexible container, such as, for example, sausage skin, coming from a rolling of folded tubular skin, and to the equipment which cuts the skin immediately after the opening of the following container has been knotted.

In the Spanish Pat. No. 475.086 of the same applicant, a method and device for knotting openings of flexible containers automatically is described. This method consists of a cord which forms a closed oblong loop which is incorporated in the process in loading rolls made up of a laminate strip of paper on one side of which the cord is arranged without there being any possibility of continuing.

By means of the mentioned method and device, a great advance in the automatic knotting of sausage skins is achieved, particularly in comparison with that described in the Spanish Pat. No. 295.446, also of the same applicant, and compared with any other method for knotting sausage skins already known. However, it is common practice in the sausage factories to cut empty skins to a set length from a roll of folded tubular skin, knotting one of the ends by means of a corresponding loop and leaving the other end open so as to be able to introduce the corresponding meat matter at a latter stage.

In all the systems known to date, this knotting of empty skins at one of the ends has to be done manually one by one, thus with the consequent employment of a person for the mentioned task, which implies a natural slowness in the realization, due to human limits.

By means of the improvements which are the object of the present invention, the operation can be realized completely automatically, in such a way that the operator in charge of the machine has only to concern himself with feeding the cord loads, the roll of hollow tubular skin and unloading the skins which are already cut and knotted at one of the ends.

Likewise, a device for forming multiple longitudinal pleats in the sausage skins is incorporated in the equipment for knotting the openings of flexible containers automatically.

With the object of improving the presentation of the tying or fastening of the ends of the sausages and of making the tension suffered by the skin in the mentioned tying or fastening operation uniform, the process of making a pleat in the skin before hand has been known for a long time.

This said pleating is carried out in one of two known ways: by means of a couple of toothed wheels, through which the skin is made to pass crosswise, or by means of the crosswise introduction of the skin among a series of parallel sheet strips which converge towards the exit opening of the pleated skin.

The toothed wheel system presents the most serious disadvantages of having the gear teeth affect the skin to the extent that they can even break it and of having to introduce the skins sideways one by one, thus preventing there being a continuous feeding of the skin.

The system which uses the converging parallel sheet strips offers the serious disadvantage in that the mentioned strips rub considerably against the skin, for which a heavy skin drive must be realized, and which also is affected by the mentioned rubbing.

Essentially, the improvements to which the present invention are directed, are characterized by the fact that they include means of hooking up the recently made loop and of driving a container and they are provided with a constant movement; some means of maintaining the mentioned constant movement; some means of driving the operating organ of the container drive cycle and of knotting and cutting the same; some means to graduate the cutting length of the container; some means for rejoining the containers once they have been cut; and a device for making multiple longitudinal folds in the tubular skin.

Other characteristics and advantages of the improvements to which the present invention is directed will be clear from the description given forthwith in relation to the enclosed drawings which illustrate, as a matter of a non-limitative example, a way of realizing the same.

FIG. 1 is a raised front view of a way of realizing the improvements of which the present invention is object.

FIG. 2 illustrates a detailed view of the shuttle hook.

FIGS. 3, 4, 5 and 6 are steps of different moments of the movement of the shuttle.

FIG. 9 shows a perspective view of the device for making multiple longitudinal folds in the tubular skin.

FIG. 10 is a view of the fold forming device described in FIG. 9, as a side view and cross section.

FIGS. 11, 12 and 13 are cross-sections steps in accordance with III—III, IV—IV and V—V of FIG. 10.

Figure 5:
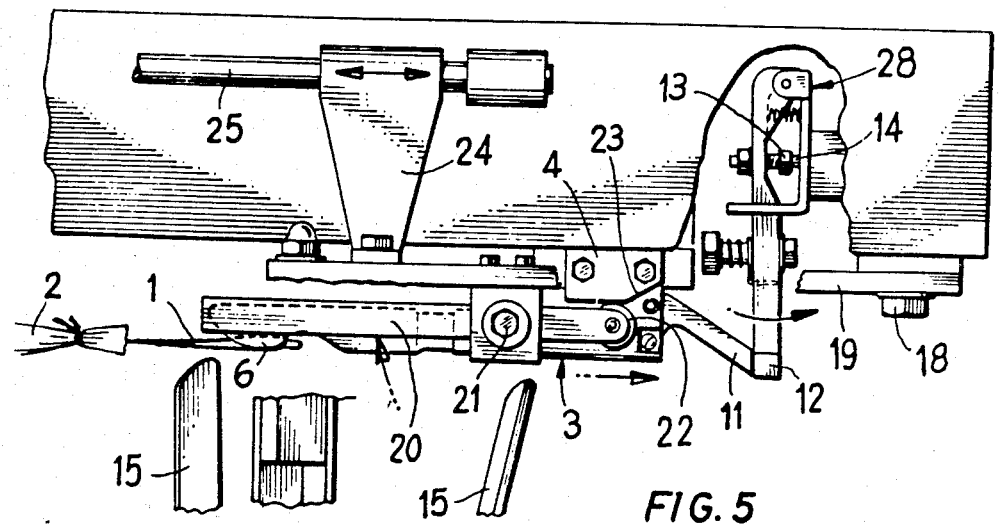

In the mentioned diagrams, it can be appreciated that, in a way of realizing the improvements in question, the recently realized loop (1) of a container (2) is hooked by some means provided with a constant movement which consist of a shuttle (3), which is equipped with a support (4) which is operated by the means produced by the constant movement.

In the mentioned shuttle (3) a hook (6) is provided. This hook comes out over the front end of the support (4), and is provided with a short longitudinal movement with respect to the latter and is submitted to the action of a drive spring (7) which tends to keep it drawn towards the support.

The rear part of the hook (6) is joined articulately in 8 to a branch of an angular lever (9), which is articulated rotationally on (10) to the support (4) at its pivot 10 and whose other free branch (11) comes out over the rear end of this.

In the initial idling position, the shuttle (3) is situated in its most distant position from the knotting point (FIG. 5). When the means making the constant movement are operated, the shuttle is driven by the said means up to the knotting point (FIG. 3), introduced in the loop (1) and starts the return (FIG. 4), hooking up the loop (1) and driving a portion of the folded tubular strip (2) until reaching the initial position (FIG. 5).

During the return (FIG. 4), the resistance offered by the tubular strip (2) overcomes the action of the drive spring (7) which acts upon the hook (6) and makes it move towards outside the support, which gives rise to the rear angular lever (9) turning round its articulation point (10) and its outer rear branch (11) adopting such a position that, in the return of the shuttle (3), the mentioned outer branch (11) runs against a lever (12) (FIG. 5) which makes up the mentioned means of driving the operation organ of the drive cycle of the strip and of the knotting and cutting. Thus the operation organ is actuated and a new cycle is begun, at the same time as a new knotting process is being carried out, a portion of tubular strip corresponding to a container is cut, and, when the shuttle (3) returns, the loop (1) of the mentioned portion of recently cut tubular strip (2) is freed from the hook and the strip falls because of gravity in such a way that the loop (1) remains hanging from a hook (15) set from underneath (FIG. 6), which makes up the rejoining means of the containers (2) which have already been cut.

Figure 8:
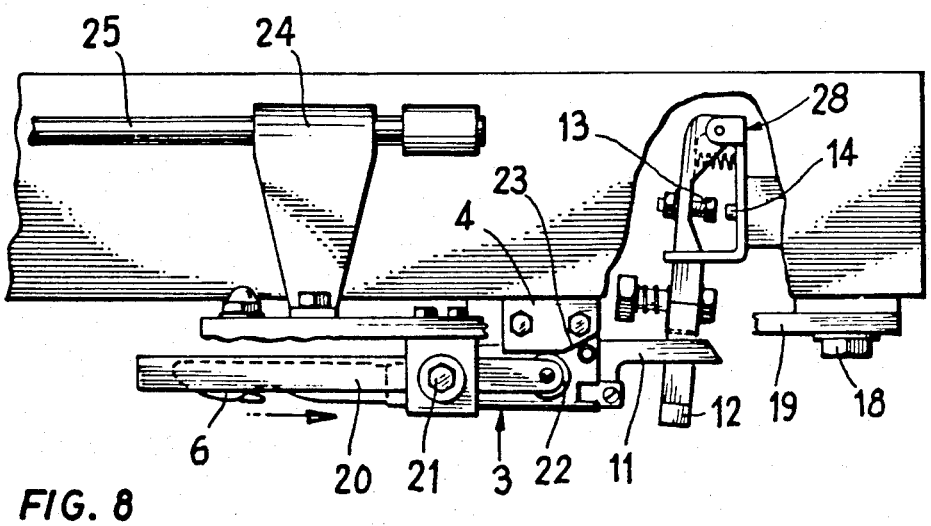
FIG. 8 is a representative view of the shuttle limit switch, when the shuttle returns to its original position without driving any container.

When the continuous cord feed for the knotting fails or when the tubular strip fails, the hook (6) of the shuttle (3) remains drawn towards the support just as illustrated in FIG. 8, and the outer branch (11) of the rear lever (9) adopts a position in which, in the return of the shuttle (3), it passes without encountering the drive lever (12) of the operation organ, and thus the device stops.

The means already mentioned for causing the constant back and forth movement in the shuttle (3) include a longitudinal pneumatic cylinder (5), whose piston is joined to the support (4) of the shuttle (3) by means of a rod (16), the said pneumatic cylinder (5) having to be put into operation in each cycle by means of the driving of the mentioned operation organ, which is more particularly formed by the stopping dog (13), jointly with the lever (12), which, when the lever is operated, rests on the pneumatic cylinder (5) and knotting and cutting device simultaneous drive push button (14). Near the place where the knotting and cutting takes place, there is a return stopping dog (17) which, when operated by the support (4) of the shuttle (3) in its feed, makes the direction of the piston of the cylinder (5) change.

The mentioned drive means of the operation organ of the cycle and the rejoining means of the already cut containers are displaceable longitudinally, so as to be able to be set at the convenient distance from the knotting point, in accordance with the desired length of each cut container (2). For this purpose, a screw (18) is provided. This screw is capable of being secured to the drive unit (28) in the protection casing (26), thus the mentioned screw (18) is moved throught the slot (27) at the same time as supporting the support bar (19) of the hooks (15). In FIGS. 1, 5, 6 and 8, the mentioned bar (19) is cut so as to make the diagrams easily comprehensible. By means of the described steps, the screw (18) can be secured in any position on slot (27).

As can be appreciated in the diagrams, there are two hooks (15), so that when one of them is full, it is sufficient to make it turn on its support until the other hook which is empty is in a position to receive the ties (1), and in such circumstances it is not necessary to stop the machine to remove the containers (2) which are cut from the hook (15) which is full.

Figure 6:
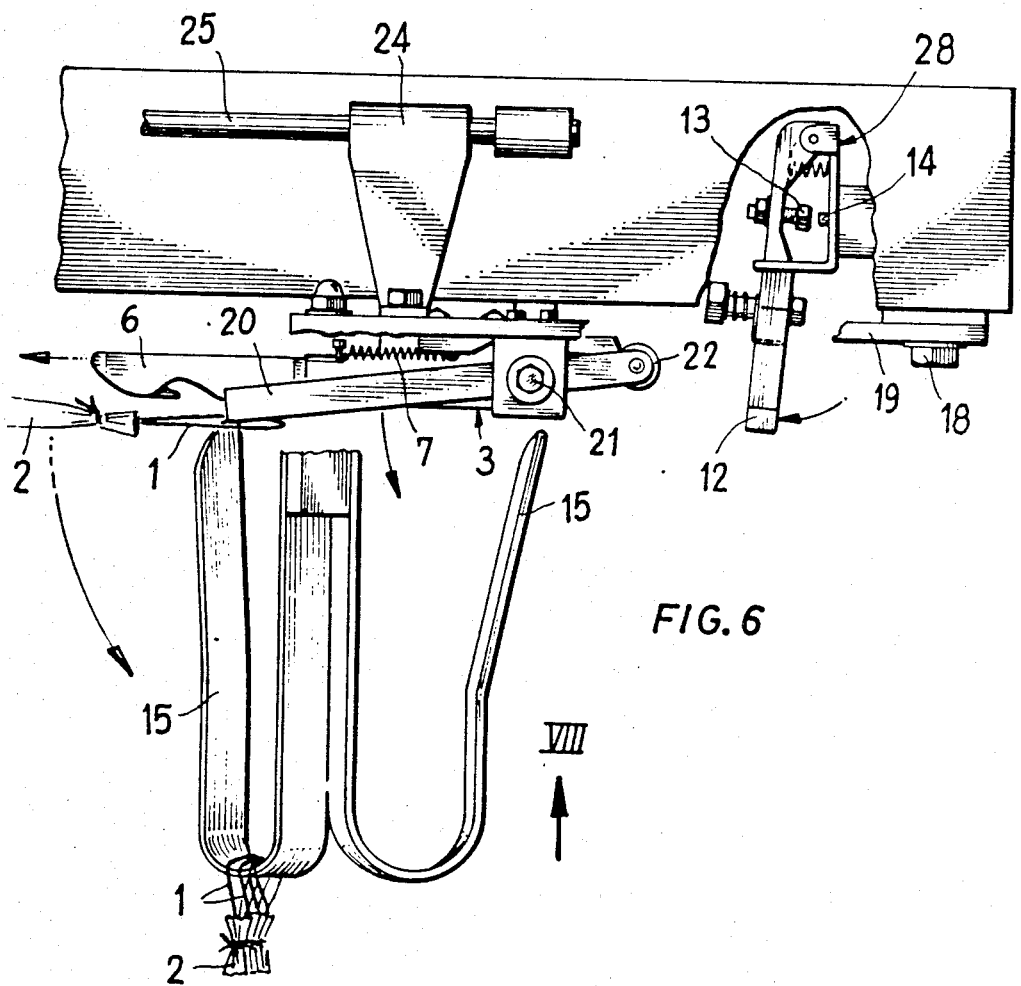
Figure 7:
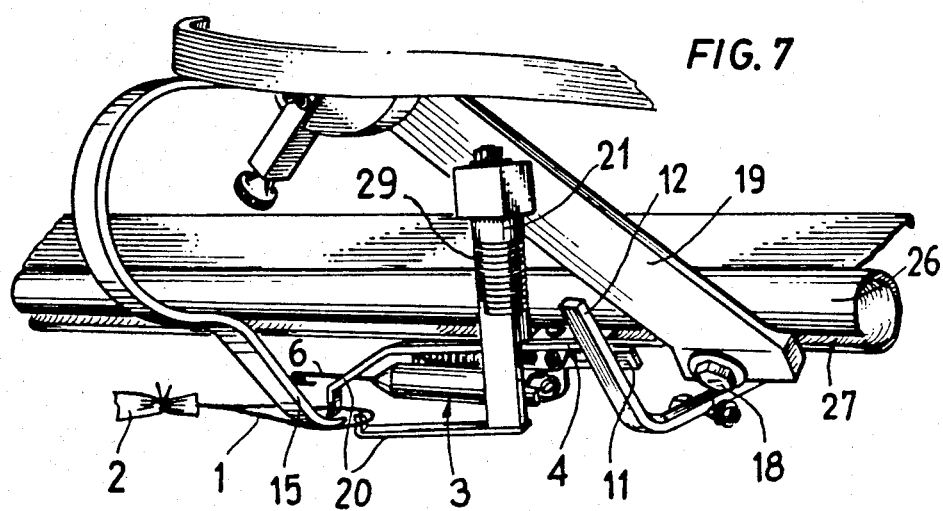
FIG. 7 illustrates a perspective view of the lower part of the hooking means and the rejoining means.

So as to facilitate the introduction of the loop (1) in the corresponding hook (15), some pushing rods (20) are provided. These rods help the tie to hook itself onto the hook (15) when the latter is detached from the shuttle (3), immediately after starting another cycle (FIG. 6). At the very same moment the cycle ends (FIG. 5), the set of rods (20), which is normally in a downward position thanks to the action of the torsion spring (29), is raised thanks to the fact that the sloping lever (23) of the support (4) acts on a small wheel (22) in the free rear end of the rods (20) and makes them rotate round the axle (21), overcoming the action of the spring (29), until adopting the position shown in FIG. 5. When the sloping level (23) no longer comes into contact with the wheel (22), which coincides with the moment when the hook (6) has become unfastened from the tie (1) (FIG. 6), the rods (20) return to their original idling position and push the mentioned loop (1) downwards, thus obliging it to hook itself onto the hook (15).

The unit made up of the hooks (15) and the pushing rods (20) is capable of changing position thanks to the fact that it is suspended from the part (24) which can be moved along the guide bar (25).

In FIGS. 9 to 13, it can be appreciated that the device for making multiple longitudinal folds in the tubular skin in question includes two flat plates, an upper one (30) and a lower one (31), which are placed parallel and opposite each other at a short distance.

The laminate strip (32) which is to be folded passes continuously between the two plates, penetrating through one end (33) without being folded, and coming out the opposite end (34), already folded in multiple longitudinal folds.

The side spaces between both flat plates (30 and 31) are closed by means of lateral limiting elements (35), placed opposite each other in pairs which are closer together at the exit end (34) than at the entry opening (33).

On the inside of the space between the two plates (30 and 31), numerous transversal folding elements are placed, the upper ones (36) and the lower ones (37), being made up of rectilinear protuberances arranged transversely between the lateral limiting elements (35).

The ends (38) of the mentioned transversal folding elements (36 and 37) are separated from the mentioned limiting elements (35) by a similar distance or one less than that which separates each of the plates (30 and 31).

Preferably, the mentioned lateral limiting elements (35) are made up of free rotating rollers with an axle perpendicular to the plates (30 and 31).

In a preferable manner of realization, the mentioned free rotating rollers show their upper part (39) which is noticeably conical and adapted for crossing the plate (30) by the corresponding orifices (40).

The mentioned transversal folding elements of at least one of the flat plates, and in the case represented, the folding elements (37) of the flat plate (31), are advantageously made up of free rotating rollers, with an axle which is parallel to the plates (30 and 31).

The mentioned transversal folding elements (36 and 37) have preferably their ends slightly beveled.

Both flat plates (30 and 31) are detachable so as to facilitate the initial placement of the strip (32) which must be folded, for example by means of variegation, as shown in FIG. 9.

Having described the nature of the invention sufficiently, and also the method of putting it into practice, it is declared that all that does not alter, change or modify its fundamental principle may be subject to variations in detail.

I claim:

1. An apparatus for knotting openings in flexible containers such as sausage skins including means for forming a loop with a string, the improvement comprising:
   hook means for engaging a loop which is attached to a container, means for moving said hook means with reciprocating motion along the path between a loop engaging and a loop discharging position, means for discharging a loop from said hook means when in said loop discharging position onto a storage means.

2. The invention as claimed in claim 1 wherein said hook means includes a shuttle hook movably mounted on a carriage.

3. The invention as claimed in claim 2 wherein said carriage includes a lever arm connected to said shuttle hook so as to be pivotable about an axis in response to movement of said shuttle hook, said apparatus including a limit means engageable by said lever arm when said shuttle hook is engaging a loop.

4. The invention as claimed in claim 3 wherein said shuttle hook is movable between a retracted and an extended position on said carriage and spring means are provided for urging said hook towards said retracted position.

5. The invention as claimed in claim 1 wherein said means for moving is a pneumatic piston and cylinder device with said piston having a rod operatively connected to said hook means.

6. The invention as claimed in claim 5 wherein a pair of limit means are provided for reversing the direction of movement of said piston in said cylinder.

7. The invention as claimed in claim 1 wherein said storage means is displaceable along an axis to vary said discharging position.

8. An apparatus for use with the invention of claim 1 including means for making multiple longitudinal folds in a web of flexible material.

* * * * *